US005775298A

United States Patent [19]

Haller

[11] Patent Number: 5,775,298

[45] Date of Patent: Jul. 7, 1998

[54] INTERNAL COMBUSTION ENGINE CONTROL

[75] Inventor: James Michael Haller, Rochester, N.Y.

[73] Assignee: General Motors Corporation, Detroit, Mich.

[21] Appl. No.: 762,626

[22] Filed: Dec. 9, 1996

[51] Int. Cl.$^6$ .................. G01L 23/22

[52] U.S. Cl. .................. 123/425; 123/436; 123/479; 123/481; 73/116; 701/111

[58] Field of Search .................. 123/425, 435, 123/479, 481, 436, 630, 419; 73/116, 117.3; 701/101, 111

[56] References Cited

U.S. PATENT DOCUMENTS 5,426,587 6/1995 Imai et al. .................. 364/431.05

OTHER PUBLICATIONS

Paper No. 950004 ION GAP Sense In Misfire Detection, Knock and Engine Control (total 6 pages numbered 21, 22, 23, 24, and 25) best available copy provided—Dated Feb. 1995.

*Primary Examiner*—Tony M. Argenbright
*Assistant Examiner*—Hieu T. Vo
*Attorney, Agent, or Firm*—Michael J. Bridges

[57] ABSTRACT

Two stroke internal combustion engine control compensates for diagnosed cylinder misfire conditions characterized by improper combustion, during a cylinder combustion event, of an air/fuel mixture in an engine cylinder by learning a required number of cylinder combustion events to periodically be skipped to allow for removal of residual combustion elements from the cylinder following improper combustion therein, and by periodically postponing cylinder combustion over the learned number of events. The learned number of events may vary across engine cylinders, across engine operating conditions, and further may vary as a function of each cylinder's misfire propensity and severity over various engine operating conditions.

12 Claims, 5 Drawing Sheets

INTERNAL COMBUSTION ENGINE CONTROL

TECHNICAL FIELD

This invention relates to internal combustion engine control and, more particularly, to closed-loop fueling control responsive to diagnosed cylinder misfire conditions.

BACKGROUND OF THE INVENTION

The cost and power to weight ratio advantages of two stroke cycle internal combustion engines is offset by the emissions levels of such engines. Many current two stroke cycle engine applications rely on relatively simple engine controls. It would be desirable to reduce two stroke cycle engine emissions without adding significant complexity to two stroke cycle engine controls. During idle and light load operating conditions in two stroke cycle engines, cylinder misfire conditions can be frequent, in which a cylinder air/fuel charge is improperly burned. Misfire conditions can significantly increase engine emissions of hydrocarbons HC. It has been determined that residual HC elements present in engine cylinders following misfire conditions may not only be exhausted from the cylinder increasing engine out emissions, but can have a deleterious effect on the quality of subsequent combustion events in the engine cylinder, perpetuating a reduced cylinder combustion quality and potentially increasing further emissions of undesirable exhaust gases from the engine. It would be desirable to detect misfire conditions in two stroke cycle internal combustion engines and to take corrective action in response thereto. It would further be desirable that such misfire detection and corrective action be highly accurate and add little to the cost or complexity of two stroke engine control.

SUMMARY OF THE INVENTION

The present invention provides for simple reliable misfire detection in a two stroke cycle internal combustion engine and for simple corrective action to minimize the emissions impact of any detected misfire condition. More specifically, individual cylinders are monitored and misfire conditions diagnosed using simple, proven diagnostics. Following a diagnosed misfire condition in a cylinder, the cylinder is disabled for a disable period sufficient to allow elimination of excessive cylinder residuals, such as HC elements, which can reduce cylinder combustion quality. The cylinder is, in accord with a further aspect of this invention, disabled by suspending combustion operations in the cylinder, such as by postponing spark plug ignition or fuel injection for the cylinder. Following elimination of the excessive residuals, the cylinder is re-enabled for continued operation. Misfire conditions are thereby isolated to limit the impact of any diagnosed misfire condition on two-stroke cycle engine emissions.

In accord with a further aspect of this invention, the degree of severity of a diagnosed misfire condition may be determined. The degree of severity is known to directly impact the level of residual emissions elements in the cylinder and thus the period needed to clear such residuals. Accordingly, the delay period is varied as a function of the determined degree of severity. In accord with yet a further aspect of this invention, the operating character of each engine cylinder is monitored and learned while the engine is operating. The propensity of each cylinder to misfire over a wide range of engine operating conditions, as well as the severity of any misfire condition over the range of engine operating conditions, are determined and stored as a function of the corresponding operating conditions. If the operating conditions are determined to be present during engine operation, the learned propensity and severity information is referenced for each cylinder and corrective combustion action is then proactively taken to adjust combustion in the cylinder to minimize the impact of misfire conditions on engine out emissions.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
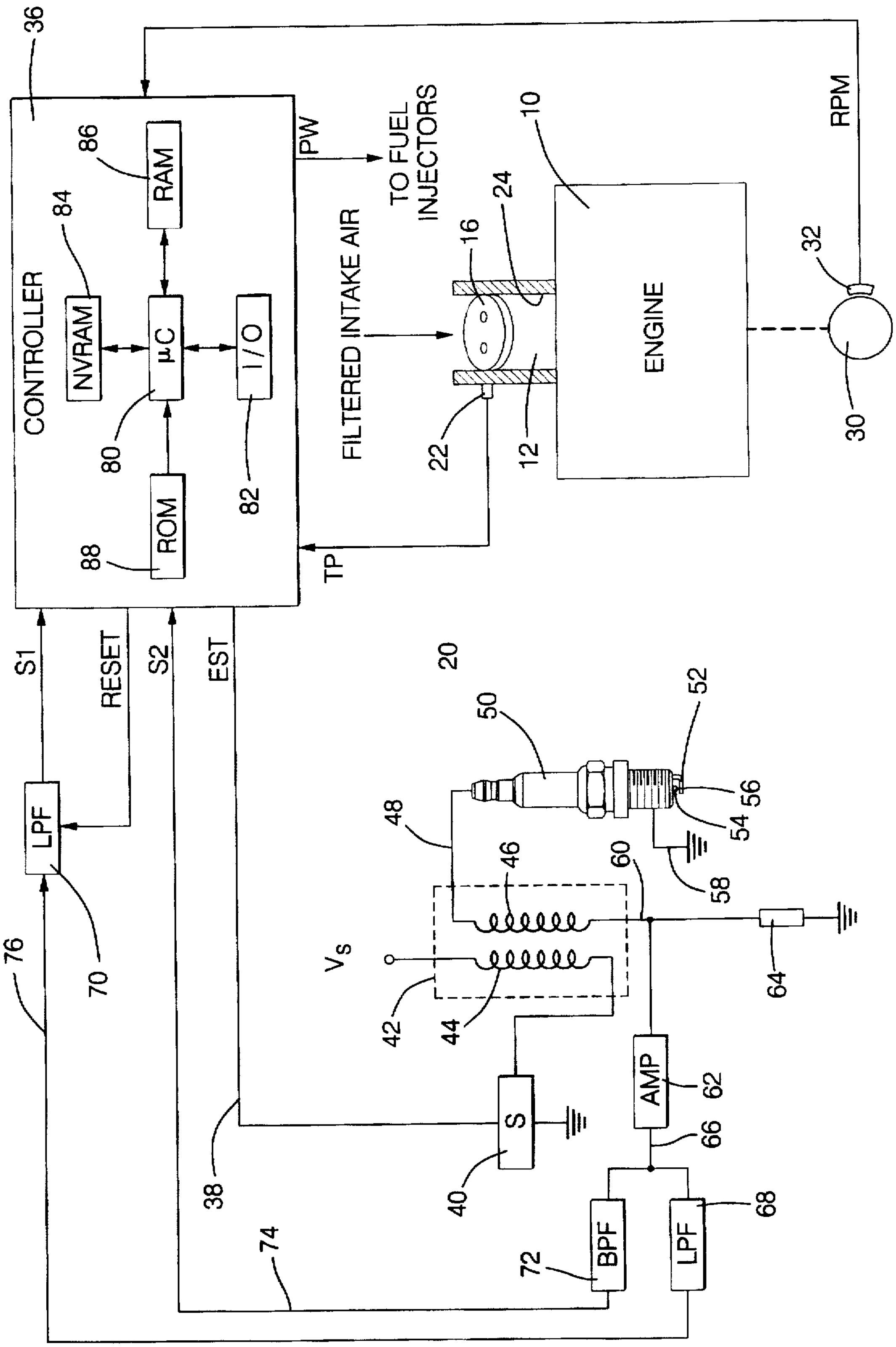
FIG. 1 is a general diagram of the engine an engine control and diagnostic hardware in accordance with the preferred embodiment of this invention.

Referring to FIG. 1, two-stroke cycle n cylinder internal combustion engine 10 receives filtered intake air through intake air passage 24 and across intake air valve 16 of the butterfly or rotary type and into intake manifold 12 for distribution to engine cylinders (not shown). In this embodiment, the number of engine cylinders n is two. The intake air valve 16 is rotated within the passage 24 to vary restriction to intake air passing therethrough. In this embodiment, the valve 16 is rotated manually, such as through a conventional linkage to an engine operator-actuated throttle cable (not shown), to vary an engine operating condition. The rotational displacement of the intake air valve is transduced by conventional rotational position sensor 22 of the potentiometric type into output signal TP. The position sensor 22 is linked to the valve 16 and includes an electrically conductive wiper arm (not shown) which slides along and in electrical contact with a resistive track (not shown) as the intake air valve 16 rotates along its range of motion, and wherein the magnitude of signal TP indicates the electrical resistance between an end of the resistive track and the wiper arm.

Inlet air is delivered to engine cylinders and mixed therein with an injected fuel quantity forming an air/fuel mixture in the cylinders which is ignited through a timed ignition arc across spaced electrodes of a spark plug 50 in each cylinder. Spark plug drive circuitry includes primary ignition coil 44 matched with secondary ignition coil 46 to form transformer 42, with the low voltage terminal of the primary ignition coil electrically attached to ignition switch S 40 controlled by the state of ignition control signal EST on line 38. The low voltage terminal of secondary ignition coil 46 is connected to a ground reference through series current sense resistor 64 via line 60. Signal amplification circuit AMP 62 is attached to the signal line 60 between secondary ignition coil 46 and current sense resistor 64 to amplify the voltage across resistor element 64 and output the amplified signal on output line 66 to bandpass filter BPF 72 tuned to pass signals above about five kHz as in filter output signal S2 on output line 74. The amplifier output signal is also passed on line 66 to a low pass filter LPF 68 tuned to pass signals having frequencies of less than about two hundred Hz to output line 76 for application as an input signal to conventional integrator circuitry INT 70. The integrator circuitry 70 integrates the signal on line 76 and provides the integrator output as signal S1 to controller. The integrator is reset by a signal RESET at an active signal level provided to the integrator 70 by controller 36. In this embodiment, the RESET signal becomes active at a pre-selected engine operating angle following a cylinder ignition event, such as about fifteen to twenty degrees of engine operating angle (with a complete engine cycle corresponding to 360 degrees of engine operating angle) following a falling edge of ignition drive signal EST. At such time, the integrator output is reset to zero and the integrator begins a new integration period which is concluded a predetermined engine operating angle thereafter, such as about forty degrees thereafter. At the conclusion of the integration period, the controller 36 samples the integrator output signal magnitude as an indication of the misfire activity for the current active cylinder for the current engine cylinder combustion event. It has been determined that significant information indicating cylinder knock conditions is present in the high frequency (above five kHz) secondary ignition coil signal content following an ignition event in a corresponding engine cylinder, and that significant information indicating the quality of a cylinder combustion event is present in the low frequency (below about two hundred Hz) secondary ignition coil signal content following an ignition event in the corresponding engine cylinder. To provide for analysis of such signal content, signals S1 and S2 are provided to a controller 36 of a conventional single chip type.

Signal EST is applied as a positive going pulses of duration corresponding to the desired primary ignition coil 44 charge time. At the time of receipt of the rising (positive going) edge of a pulse of signal EST, a switch circuit within circuitry S 40 is closed, allowing current to flow through primary ignition coil 44, charging up the coil. The switch circuit within circuitry S is closed at the time of the falling edge of the pulse of signal EST following said rising edge of signal EST, causing an interruption in current flowing through ignition coil, inducing a high current surge through secondary ignition coil 46 through line 48 to spark plug cathode 54, inducing an arc across spark plug gap 56 to a grounded spark plug anode 52. The spark plug 50 is positioned with an engine cylinder so that the arc across gap 56 ignites the air/fuel mixture in the cylinder substantially at the time of the falling edge of the of EST, the time of the cylinder ignition event in the cylinder. A parallel capacitor-avalanche diode circuit (not shown) is included with circuitry S 40 with a first node of the parallel circuit tied to a ground reference and a second node opposing the first node tied to the primary ignition coil 44. The avalanche diode is rated at about 300 volts. The capacitor is charged up to about 300 volts as the primary ignition coil is charged up following the rising edge of EST, as described. Following discharge of the ignition coil 44, the capacitor of circuit 40 discharges through the primary ignition coil 44, inducing a direct current bias potential across the spark plug gap 56 for a relatively short time period. The cathode to anode ion current during this time period is directly proportional to the number of combustion ions that are present in the area of the spark plug gap 56 and subsequently throughout the cylinder as combustion takes place in the cylinder. The quality of the combustion event in the engine cylinder is indicated by the ion current level across the spark plug gap. The ion current is measured while the capacitor of circuitry S 40 is discharging through the primary coil by sampling the voltage drop across current sense resistor 64, which is amplified by AMP 62 and, for the DC current corresponding to applied DC bias voltage applied across the gap 56, is passed through LPF 68 on line 76. As described, the controller 36 receives the integrated LPF output signal, for example through a standard analog to digital converter device integral to input/output circuitry I/O 82, and samples the signal magnitude at the end of an integration period. The magnitude of the integrator output indicates the quality of the combustion event in the engine cylinder, and is stored in controller random access memory RAM 86 for use in engine control operations, to be described. Controller 36 further includes such conventional elements as a read only memory device ROM 88 for read only storage of program instructions, data constants and calibration values, non-volatile random access memory devices NVRAM 84 for non-volatile read/write data storage, and a microcontroller element μC 80 for reading and executing the program instructions stored in ROM 88 for carrying out engine control and diagnostics operations. Random access memory devices RAM 86 are provided as quick-access volatile memory devices which may clear if the controller is not operating, for example when ignition power is manually removed from the controller to stop engine operation. NVRAM 84, on the other hand, retains its stored values while the controller is not operating, as NVRAM is maintained not by ignition power, but by power from a more permanent source, such as a battery having a supply signal that is applied to NVRAM even while the controller is not operating. Upon removal of battery power from NVRAM, such as when the battery supply signal is disconnected from the controller 36, the values stored in NVRAM may be assumed to be cleared.

The control operations carried out by controller 36 include control of cylinder fueling. A fuel injector (not shown) is provided directly in each of the n engine cylinders. The injectors are opened for a period of time corresponding to the duration of timed fuel control pulses PW issued by the controller 36 to the injectors, wherein pressurized fuel is delivered through the injectors to the cylinders while the injectors are driven open.

Figure 2:
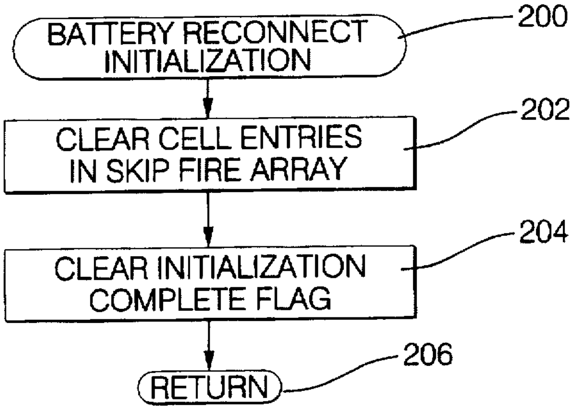
FIGS. 2–6 are computer flow diagrams illustrating a flow of operations for engine control and for misfire diagnostics applied to the hardware of FIG. 1.

Referring to FIGS. 2–6, a series of control and diagnostic operations are illustrated as they are to be executed by controller in a step by step manner while an engine operator manually maintains ignition power to the controller 36 to provide for engine operation. The operations of FIGS. 2–6 may be stored as software routines in ROM in an instruction-by-instruction format and are invoked periodically by the μC 80 following certain time periods or following certain engine events. More specifically, the operations of FIG. 2 are to be carried out following a re-connect of the supply signal from the battery to the controller 36. The controller references such operations from ROM 88 (FIG. 1) and begins executing such operations at a step 200, and next clears cell entries in a skip fire memory array, to be described at a step 202. An initialization complete flag is next set at a step 204 to indicate memory devices have not been initialized since the supply signal disconnect. The operations are next concluded at a step 206 to proceed to carry out any operations required by controller 36 for startup of the controller following removal of the supply signal therefrom.

Figure 3:
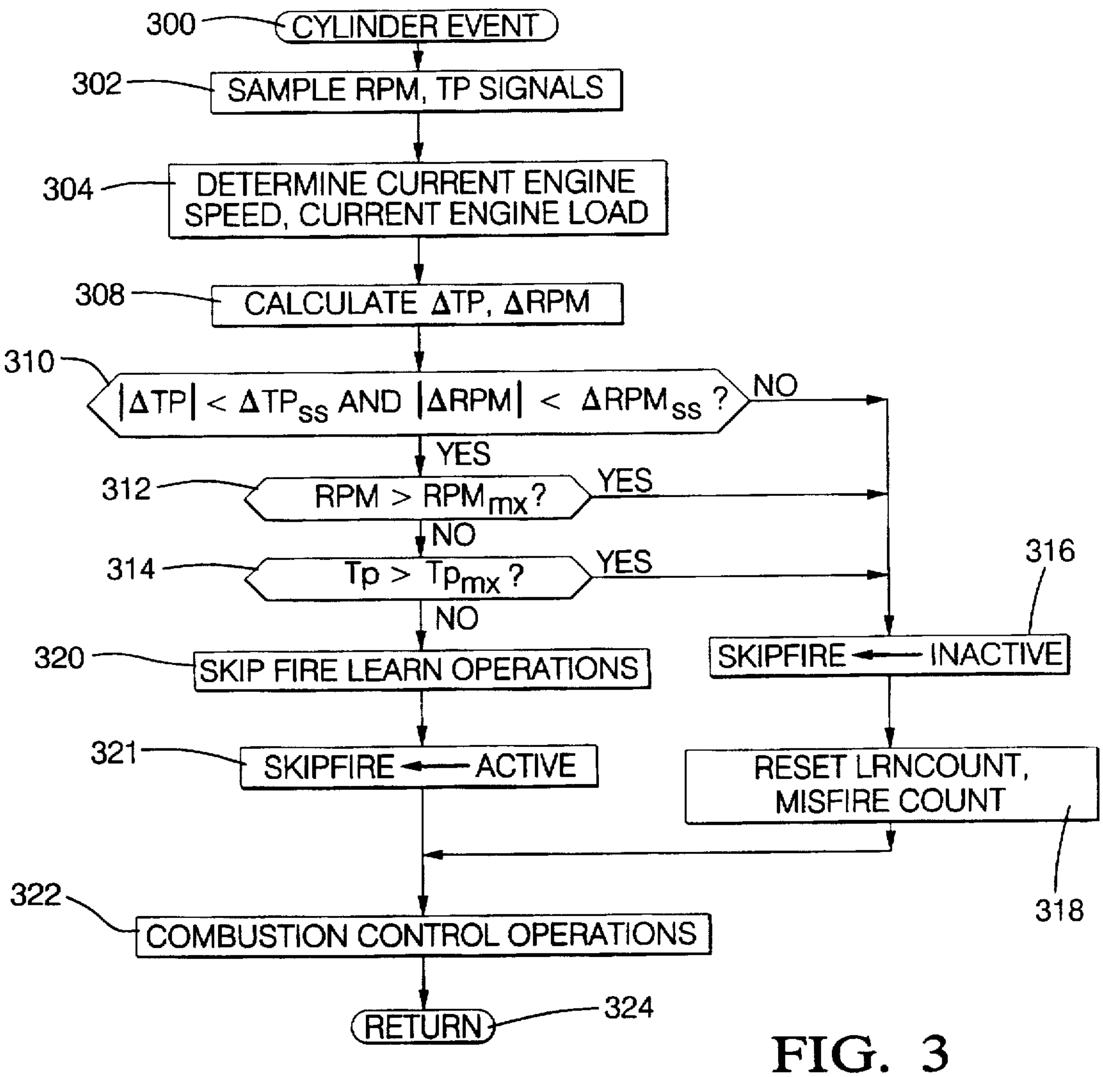
Figure 4:
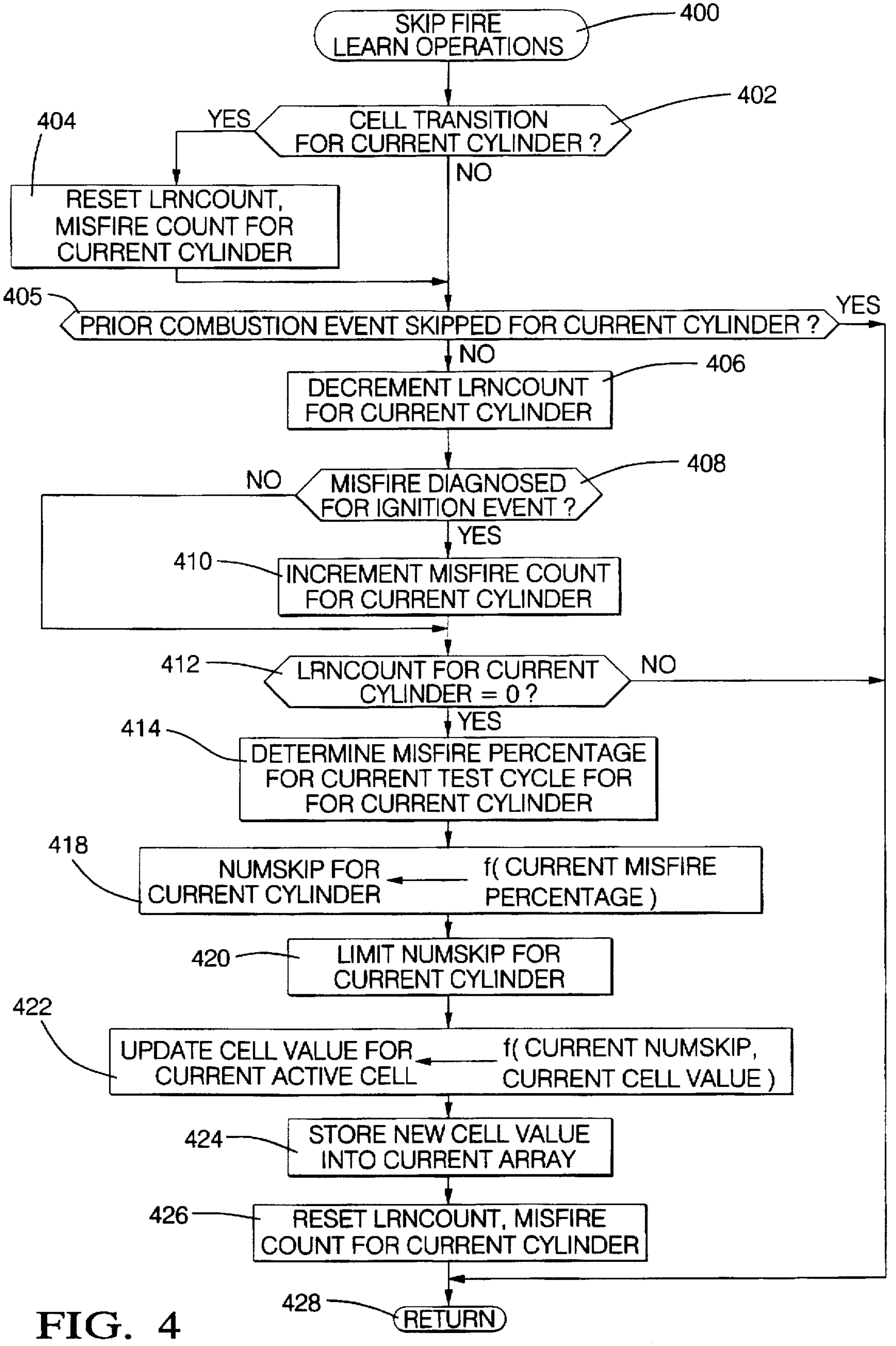
Figure 5:
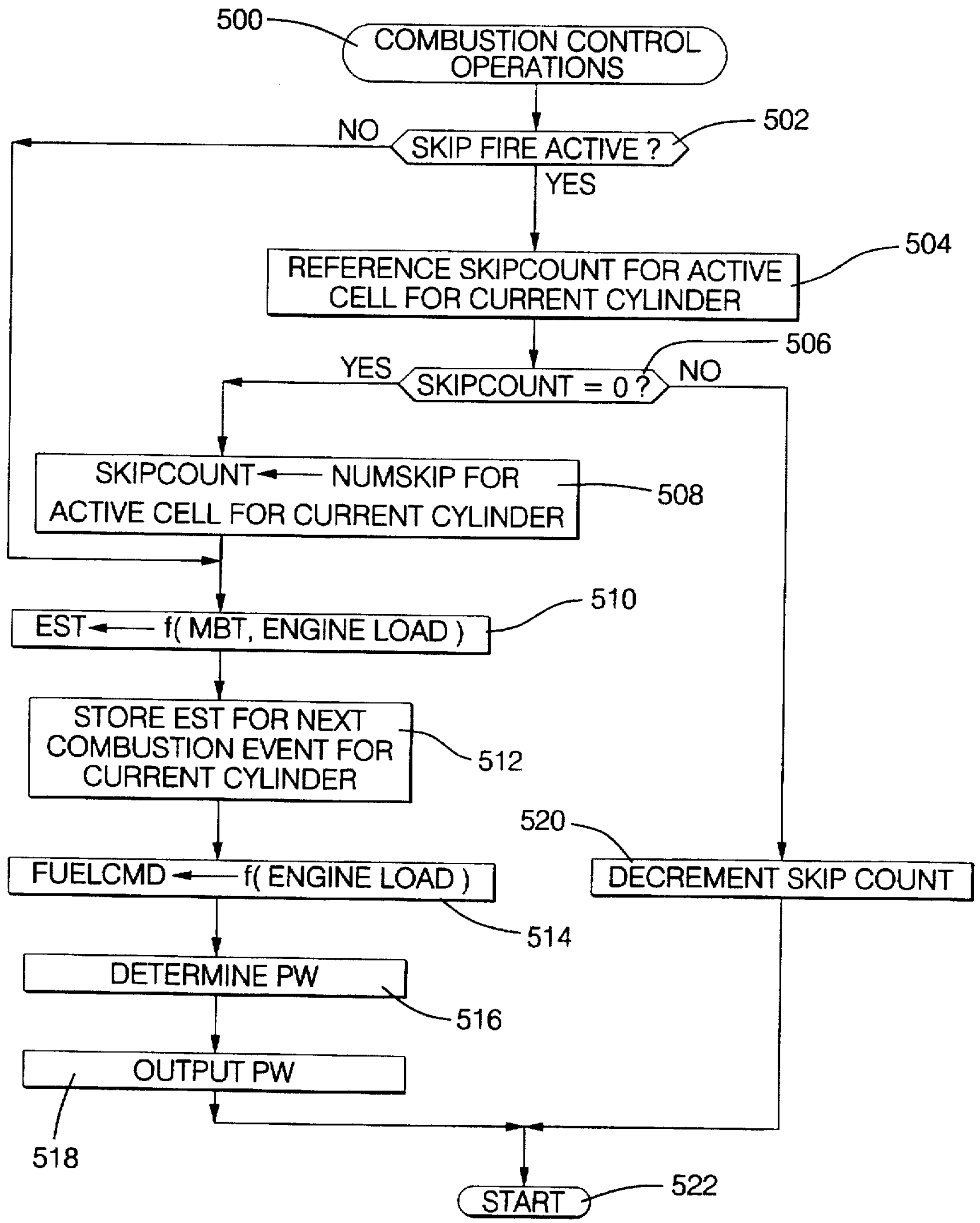

Engine cylinder events are defined in this embodiment as a time of occurrence of a predetermined engine operating angle within an engine cycle, such as a cylinder top dead center operating angle. When an engine cylinder passes through such an operating angle, a defined signal pattern of signal RPM may be detected by controller 36, for example when signal RPM crosses a signal threshold in a predetermined direction. When cylinder events are detected in this embodiment, a cylinder event interrupt is generated by controller by implementing an interrupt strategy in accord with well-established programming principles. Upon occurrence of the cylinder event interrupt, an interrupt vector is stored in a controller manufacturer specified memory location in ROM 88 (FIG. 1) pointing to a start of an interrupt service routine in ROM 88. The cylinder event interrupt service routine includes a series of operations for carrying out control or diagnostic operations which are required for each cylinder event or for multiples of cylinder events. The operations of the cylinder event service routine of this embodiment are illustrated in FIGS. 3–5. Such operations begin at a step 300 of FIG. 3, and proceed to sample input signals including signal RPM and signal PT at a next step 302. Current engine speed and current engine load are determined at a next step 304 by filtering and processing the sampled RPM and TP input signals. A time rate of change in valve position, labeled ΔTP and a time rate of change in engine speed, labeled ΔRPM are next determined, for example as a simple difference between consecutive TP and RPM samples, respectively, at a next step 308.

A steady state operating condition analysis is next carried out at a step 310 in which it is determined whether a steady state engine operating condition is present in which the accurate misfire condition compensation may be applied in accordance with this embodiment. A steady state engine operating condition is a condition characterized by substantially no intake manifold filling or depletion, and is assumed to be present if the magnitude of ΔTP is less than a calibrated threshold ΔTPss, set close to zero, and if the magnitude of ΔRPM is less than a calibrated threshold ΔRPMss, set to about 100 r.p.m. If the steady state operating conditions are not determined to be present at the step 310, skipfire operations, for compensating any diagnosed cylinder misfire condition are disabled by setting a skipfire active flag to an inactive status at a step 316, and then be resetting stored skipfire values at a next step 318. Combustion control operations are next executed at a step 322, to be described.

Returning to step 310, if the steady state operating conditions are determined to be met, misfire detection and compensation operations are continued by proceeding to compare current engine speed as represented by filtered conditioned signal RPM with a calibrated maximum tolerable engine speed RPMmx for misfire diagnostic and compensation operations. In this embodiment, skip fire operations are not required when engine speed is above RPMmx, as high cylinder pressure provides the required cylinder scavenging following a misfire condition. RPMmx may be calibrated to about 2500 r.p.m. If engine speed exceeds RPMmx as determined at the step 312, the described steps 316, 318, and 322 are carried out. If engine speed is less than or equal to RPMmx as determined at the step 312, engine inlet air valve position, as indicated by filtered, conditioned signal TP is compared to TPmx, a maximum tolerated valve position for diagnostic and compensation operations of this embodiment, at a next step 314. TPmx may be determined through a conventional calibration procedure as the maximum inlet air valve opening position under which the misfire diagnostic and compensation operations of this embodiment may be carried out without perceptibly perturbing engine performance or emissions away from desired performance or emissions levels. If TP is greater than TPmx as determined at the step 314, the described steps 316, 318, and 322 are carried out. Otherwise, if TP is less than or equal to TPmx as determined at the step 314, skip fire learn operations are initiated at a step 320 by executing the operations of FIG. 4, beginning at a step 400. The skip fire learn operations generally determine, for an active cell corresponding to a current engine operating condition, a required misfire compensation strategy based on both current and historical misfire proclivity. In this embodiment, each engine cylinder has a stored array of cells, with each cell containing a learned compensation value which may be continuously updated while the engine is operating. The compensation values represent a number of combustion events that should be skipped (not carried out) following a diagnosed misfire condition for a cylinder to minimize the chance that an isolated misfire condition may lead to further improper combustion in the engine cylinder.

More specifically, the operations of FIG. 4 begin at a step 400 and proceed to determine whether a cell transition is currently taking place in which the current active cell of the array for the current engine cylinder is different than the most recent prior active cell for that cylinder. Each cell is assigned a range of distinct engine parameter values. When current engine parameter values are within the range for a cell, that cell becomes active and stays active until current engine parameter values move outside the range assigned to that cell. In the n cylinder engine 10 (FIG. 1) of this embodiment, n arrays of cells are provided, each array dedicated to an engine cylinder for storing compensation information solely for that cylinder.

Returning to FIG. 4, if, for the current active cylinder (which is the cylinder for which the current cylinder event was detected) is undergoing a cell transition as determined at the step 402, counters used to monitor misfire activity, including counter LRNCOUNT and a misfire count for the current cylinder are reset at a next step 404. LRNCOUNT is reset to a calibrated number, such as twenty-five in this embodiment and misfire count is reset to zero. Next, or if no cell transition is detected at the step 402, a determination is made at a step 405 as to whether the most recent prior combustion event for the current cylinder was "skipped," in which cylinder fueling and ignition events that are normally required for a combustion event in the current cylinder, were not executed for the most recent prior engine cycle. If such event was skipped, it may skew the learn operations of FIG. 4, so such operations are bypassed until just after a next combustion event in the current cylinder the quality of which may be accounted for through further operations of FIG. 4. As such, if it is determined that the prior combustion event for the current cylinder was skipped at the step 405, the operations of FIG. 4 are concluded by returning, via a next step 428, to the operations of FIG. 3, to execute a next step 321, to be described. If the event was determined to not have been skipped at the step 405, the skip fire learn operations of FIG. 4 are continued by proceeding to decrement a learn counter LRNCOUNT for the current cylinder at a next step 406. A next step 408 examines an output of a misfire diagnostic for the current cylinder. The misfire diagnostic is illustrated through the operations of FIG. 6, to be described. If a misfire has been diagnosed for the current cylinder for the most recent prior engine cycle, then the misfire count for the current cylinder is incremented at a next step 410. Next, or if no misfire condition was diagnosed at the step 408, LRNCOUNT is compared to zero, to determine if the current sampling period of about twenty-five cylinder events for the current cylinder is concluded. If LRNCOUNT for the current cylinder has been decremented to zero as determined at the step 412, the misfire activity over the twenty-five events of the test period is analyzed at steps 414–426. Otherwise, if LRNCOUNT is not zero as determined at the step 412, the current iteration of the skip fire learn operations is complete, and the routine is concluded by returning, via a next step 428, to the operations following step 320 of FIG. 3.

Returning to FIG. 4, the operations for analyzing misfire activity over a test period begin at a step 414 at which a misfire percentage is determined for the current cylinder as a ratio of misfire count to twenty-five. Further, any value, such as a standard deviation value, representing the misfire activity of the current cylinder over the just concluded test period may be provided as the misfire percentage determined at step 414. A value NUMSKIP for the current cylinder is next determined as a function of the misfire percentage at a next step 418. The functional relationship between NUMSKIP and misfire percentage may be established through a conventional calibration procedure as the number of skips of combustion events for the current cylinder that are required to compensate a cylinder having a misfire level corresponding to that represented by the misfire percentage. The compensation provides for exhausting of the various residuals typically present in the cylinder following misfire conditions to minimize further improper combustion conditions in a cylinder following a misfire condition. For example, the value NUMSKIP may be determined as follows:

$$NUMSKIP=K*1/(1-\text{misfire percentage})$$

in which K is a calibrated integer. After determining NUMSKIP for the current cylinder at the step 418, it is limited to a calibrated maximum value at a next step 420 to avoid excessive compensation of a misfire condition which may lead to measurably reduced engine performance. The cell value in a current active cell in the array of such cells for the current active engine cylinder is next updated as a function of the value stored in the cell and the NUMSKIP value determined at the step 418. The cell value update should provide for controlled change in the cell value toward NUMSKIP, such as along a ramp trajectory, as follows:

$$\text{New Cell Value}=\text{Current cell value}+M*(NUMSKIP-\text{Current Cell Value})$$

in which M is the ramp rate as may be established through a conventional calibration procedure. The New Cell Value determined at the step 422 is stored as the new cell value in the active cell for the current cylinder at a next step 424, and LRNCOUNT and misfire count for the current cylinder are then reset to twenty-five and zero, respectively, at a next step 426. The inventor intends that information on the severity of a diagnosed misfire condition may further be included in the information analyzed through the operations of FIG. 4 to define the character of the combustion condition in the engine cylinder. For example, the average of the magnitude of signals S1, indicating cylinder combustion quality, may be determined over each test cycle of FIG. 4 by summing S1 magnitudes at a step prior to the step 408, and by dividing, at the end of the test cycle (for example just after the step 414), the sum by the number of samples, such as may be twenty-five in this embodiment. The average S1 magnitude may then used to adjust, in accord with a calibrated function stored in ROM 88 (FIG. 1), the NUMSKIP value determined at the step 418, so the misfire compensation is responsive not only to the frequency of misfire conditions in the current cylinder, but to the severity of such misfire conditions.

Returning to FIG. 4, after carrying out the step 426, the skip fire learning for the current engine cylinder event is concluded by returning, via the step 428, to the operations of FIG. 3, at which a next step 321 sets a flag SKIPFIRE in RAM 86 (FIG. 1) to an active level, and then a step 322 is executed to carry out combustion control operations. Such combustion control operations are illustrated as FIG. 5, and begin when initiated at the step 322 of FIG. 3, at a step 500. The combustion control operations provide for fuel and ignition control operations for an active engine cylinder (the cylinder about to undergo its combustion event). Specifically, the operations proceed from the step 500 to determine if skipfire is active at a next step 502 by examining the flag SKIPFIRE. Is SKIPFIRE is set to an active level, engine operating conditions are present under which skipfire operations are desired, and such skipfire operations are carried out by referencing the current skipcount value SKIPCOUNT for the active cell of the currently active engine cylinder at a next step 504. The value of SKIPCOUNT is set and maintained through the operations of FIG. 5. SKIPCOUNT is next compared to zero at a step 506. If SKIPCOUNT is at zero, the combustion event for the current active cylinder is not to be bypassed, and SKIPCOUNT is next reset to NUMSKIP for the active cell of the current cylinder at a step 508, wherein NUMSKIP is set, for the active cell of the current cylinder, through the described operations of FIG. 4. After resetting SKIPCOUNT at the step 508, or if skipfire operations were determined to not be active at the step 502, a spark timing command is determined at a step 510 as a function of engine load and a minimum best torque spark timing value MBT, as may be referenced from a stored schedule of MBT values as a function of current engine operating conditions, as is generally understood in the art. The spark timing command EST is next stored for use in timing the next combustion event for the current cylinder at a step 512. Ignition timing control operations, such as may be stored in the form of standard control operations in ROM 88 (FIG. 1) may be invoked to output a signal EST corresponding to the command EST to drive circuitry 40 to control timing of the combustion arc across the spark plug gap 56 (FIG. 1). A fuel control command FUELCMD is next determined as a function of engine load at a step 514 corresponding to the quantity of fuel to be delivered to the current engine cylinder at a next fuel injection time. FUELCMD may be referenced at the step 514 from a stored calibrated schedule of such commands as a function of current engine load. A fuel injector pulse width is next calculated at a step 516 as a function of FUELCMD as the injector opening time required to allow passage of a quantity of fuel corresponding to FUELCMD to pass through the injector and into the cylinder or into a cylinder intake runner. Fuel injector flow characteristics may be applied in a determination of the functional relationship between FUELCMD and a pulse width at the step 516, such as may be provided by an injector manufacturer or determined experimentally.

Following determination of the fuel injector pulse width, the fuel command is output to an injector drive circuit which may be internal to controller 36 (FIG. 1) at a step 518 which drive circuit issues a current pulse width command PW to the fuel injector for the current engine cylinder to drive the injector to an open position for the time duration of the pulsewidth, as is generally understood in the art. Following the step 518, the combustion control operations of FIG. 5 are concluded by returning, via a next step 522, to resume execution of the operations of FIG. 3 at a next step 324 which concludes the operations required to service the cylinder event interrupt that was triggered by the cylinder event for the current engine cylinder, as described. The operations of FIG. 3 will be re-executed following a next cylinder event for a next active engine cylinder, to provide for misfire diagnostic and learning operations, and to provide for fuel and ignition control operations. Returning to step 506, if SKIPCOUNT is determined to not be zero, then the current combustion event for the current active engine cylinder is to be bypassed to allow for removal of misfire residuals in the current active engine cylinder in accord with the principles of this invention. In this embodiment, the current combustion event is bypassed by not executing the described steps 510–518. Accordingly, if SKIPCOUNT is not zero as determined at the step 506, it is decremented at a next step 520 to indicate that the event has been bypassed, after which the combustion control operations of FIG. 5 are concluded by executing the described step 522.

Figure 6:
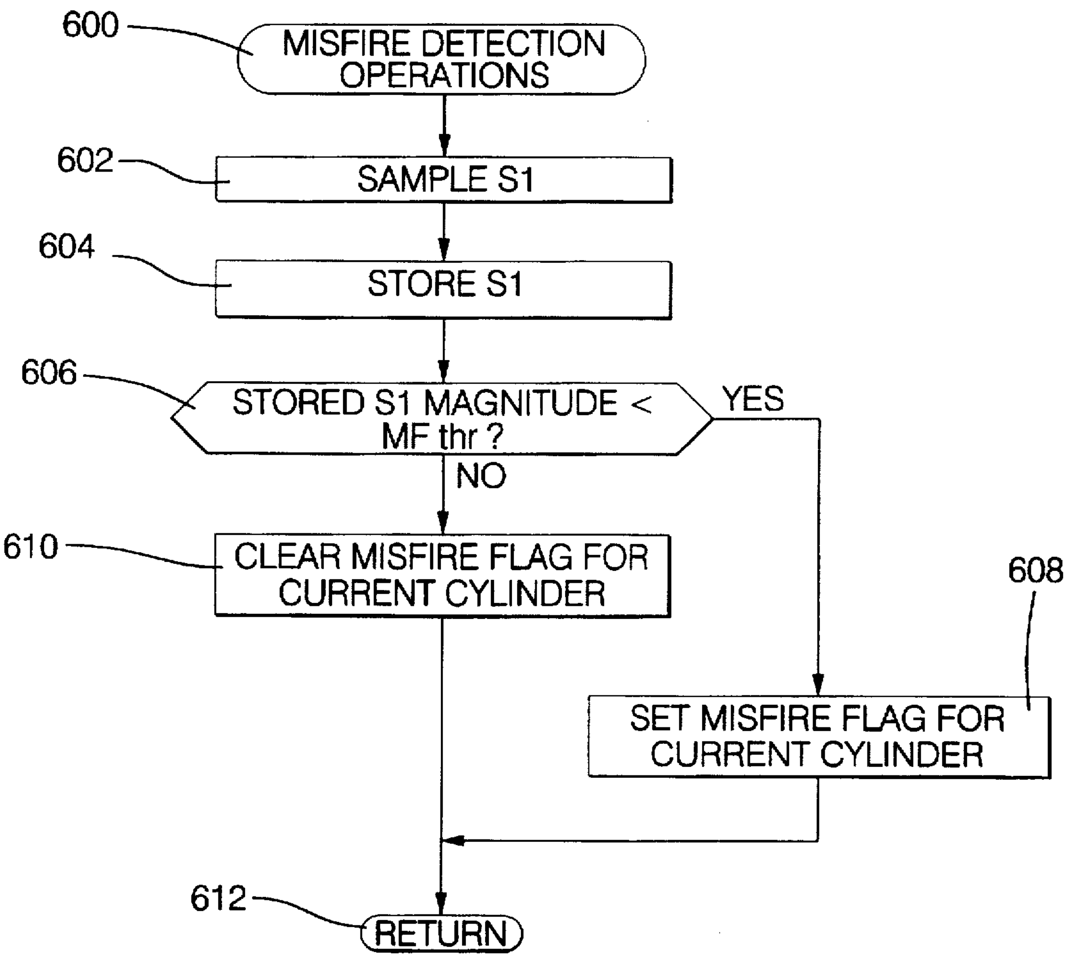

Referring to FIG. 6, misfire detection operations are illustrated beginning at a step 600. Such operations are carried out at the conclusion of each integration period of the integrator INT 70 of FIG. 1. As described, an integration period is provided following each EST signal falling edge during which the signal on line 76 is integrated by integrator INT 70. In this embodiment, the integration period starts about fifteen to twenty degrees of engine operating angle following the falling edge of EST, and concludes about forty degrees thereafter. At the start of the integration period, the signal RESET is set to an active level to clear the integrator output to zero. At the end of the integration period, the operations of FIG. 6 are executed, such as initiated by a controller interrupt, to sample and process the integrator output as an indication of the quality of combustion for the active engine cylinder (the cylinder having just undergone its ignition event). The operations of FIG. 6 begin at a step 600 and proceed to sample the integrator output, for example through a standard analog to digital converter device (not shown) at a step 602. The sample is next stored in RAM 86 at a step 604, and is compared to a signal threshold MFthr at a next step 606. MFthr is calibrated as the integration value corresponding to a minimum acceptable ion current level in the cylinder following the combustion event that provides for substantially complete consumption of the air/fuel mixture in the engine cylinder so that misfire compensation operations in accord with this embodiment are not required.

If S1 is less than MFthr as determined at the step 606, a misfire flag for the current engine cylinder is set at a next step 608 to indicate occurrence of a poor quality combustion event in the current cylinder. If S1 is not less than MFthr as determined at the step 606, then the misfire flag is cleared for the current cylinder to indicate no such misfire condition occurred. Following step 608 or 610, a step 612 is executed to conclude the misfire detection operations of FIG. 6 and to return to execute other ongoing control or diagnostic operations that may have been interrupted to allow for execution of the operations of FIG. 6 following the conclusion of the integration period. The inventor intends that information indicating combustion quality for the combustion event being diagnosed through the operations of FIG. 6 may be stored through the exercise of ordinary skill in the art, such as by storing the magnitude of signal S1 in a location in RAM 86 (FIG. 1) after updating the misfire flag, wherein such information may be used to adjust the corresponding misfire compensation, as described in the operations of FIG. 4.

The preferred embodiment is not intended to limit or restrict the invention since many modifications may be made through the exercise of ordinary skill in the art without departing from the scope of the invention.

The embodiments of the invention in which a property or privilege is claimed are described as follows.

What is claimed is:

1. An engine control method for controlling combustion of an air/fuel mixture in a cylinder of a two stroke cycle internal combustion engine in response to a diagnosed misfire condition to improve cylinder combustion quality, comprising the steps of:

diagnosing a misfire condition in the engine cylinder;

referencing a stored skip value representing an engine operating period over which combustion events in the cylinder are to be postponed following diagnosis of the misfire condition; and postponing combustion events in the engine cylinder over the engine operating period in response to the diagnosed misfire condition.

2. The method of claim 1, further comprising the steps of:

providing a plurality of cells with each cell corresponding to an engine operating condition range, the combined ranges corresponding to the plurality of cells making up a predetermined misfire compensation range, and wherein each cell of the plurality contains a skip value;

sampling input signals indicating a current engine operating condition; and identifying an active cell from the plurality of cells as the one of the plurality of cells corresponding to an engine operating condition range that includes the current engine operating condition;

and wherein the referencing step references the stored skip value as the skip value of the identified active cell.

3. The method of claim 2, further comprising the step of:

adjusting the skip value of the active cell, by (a) determining an engine cylinder misfire frequency while the cell is identified as active, (b) generating an updated skip value for the active cell as a predetermined function of the misfire frequency and of the skip value of the active cell, and (c) replacing the skip value of the active cell with the updated skip value for the active cell.

4. The method of claim 3, wherein the determining step further comprises the steps of:

activating a test period;

monitoring the combustion quality of each cylinder combustion event occurring during the test period;

comparing the combustion quality to a threshold quality level for each cylinder combustion event occurring during the test period;

identifying a combustion event as a misfire event when the combustion quality thereof is below the threshold quality level; and determining the misfire frequency as a function of the number of combustion events identified as misfire events during the test period and of the number of combustion events occurring during the test period.

5. The method of claim 2, further comprising the step of:

adjusting the skip value of the active cell, by (a) determining an engine cylinder misfire severity value representing the severity of misfire conditions in the cylinder while the cell is identified as active, (b) generating an updated skip value for the active cell as a predetermined function of the misfire severity value and of the skip value of the active cell, and (c) replacing the skip value of the active cell with the updated skip value for the active cell.

6. The method of claim 1, wherein the postponing step further comprises the step of:

suspending delivery of at least one of fuel and air to the cylinder over the engine operating period in accord with the referenced skip value.

7. The method of claim 1, wherein an ignition signal is issued to a spark plug disposed within the cylinder to ignite the air/fuel mixture in the cylinder at periodic cylinder combustion events to provide for combustion in the cylinder, and wherein the postponing step further comprises the step of:

suspending issuance of the ignition signal to the spark plug for the engine operating period in accord with the referenced skip value.

8. A misfire compensation method for selectively delivering fuel and an ignition signal to a two stroke engine cylinder to compensate for cylinder misfire conditions, the fuel being provided to the cylinder for mixing with cylinder intake air prior to each successive cylinder combustion event and the ignition signal being provided to a spark plug corresponding to the engine cylinder to ignite the mixed fuel and air within the cylinder at each executed cylinder combustion event, the method comprising the steps of:

estimating a cylinder misfire propensity representing the propensity for improper ignition of the mixed fuel and air within the cylinder;

determining a skip value as a function of the estimated propensity, the skip value representing a number of cylinder combustion events to be skipped following an executed cylinder combustion event to compensate for the misfire propensity of the engine cylinder;

suspending delivery of at least one of fuel to the cylinder and the ignition signal to the spark plug corresponding to the cylinder for the number of combustion events indicated by the skip value.

9. The method of claim 8, further comprising the steps of:

providing a stored array of cells with each cell of the array corresponding to an engine operating condition range and with the combined ranges of the array defining a predetermined misfire compensation range, and wherein each cell contains a skip value;

sampling input signals indicating a current engine operating condition; and identifying an active cell from the stored array of cells as the one of the stored array corresponding to an engine operating condition range that includes the current engine operating condition;

and wherein the determining step determines the skip value as the skip value of the identified active cell.

10. The method of claim 9, further comprising the step of:

adjusting the skip value of the active cell, by (a) estimating an engine cylinder misfire propensity while the cell is identified as active, (b) generating an updated skip value for the active cell as a predetermined function of the estimated misfire propensity and of the skip value of the active cell, and (c) replacing the skip value of the active cell with the updated skip value for the active cell.

11. The method of claim 10, wherein the step of estimating engine cylinder misfire propensity while the cell is identified as active further comprises the steps of:

activating a test period;

monitoring the combustion quality of each cylinder combustion event occurring during the test period while the cell is identified as active;

comparing the combustion quality to a threshold quality level;

identifying a combustion event as a misfire event when the combustion quality thereof is below the threshold quality level; and estimating the misfire propensity as a function of the number of combustion events identified as misfire events during the test period and of the number of combustion events occurring during the test period.

12. The method of claim 9, further comprising the step of:

adjusting the skip value of the active cell, by (a) estimating an engine cylinder misfire severity value representing the severity of misfire conditions in the cylinder while the cell is identified as active, (b) generating an updated skip value for the active cell as a predetermined function of the estimated misfire severity value and of the skip value of the active cell, and (c) replacing the skip value of the active cell with the updated skip value for the active cell.

* * * * *